United States Patent [19]

Cresswell et al.

[11] Patent Number: 4,668,485

[45] Date of Patent: May 26, 1987

[54] RECOVERY OF SODIUM ALUMINATE FROM BAYER PROCESS RED MUD

[75] Inventors: Pearson J. Cresswell, Clifton Hill; Ian L. Grayson, Burwood; Andrew H. Smith, Croydon Hills, all of Australia

[73] Assignee: Comalco Aluminum Limited, Victoria, Australia

[21] Appl. No.: 807,319

[22] Filed: Dec. 10, 1985

[30] Foreign Application Priority Data

Dec. 21, 1984 [AU] Australia ............................. PG8679
Jan. 7, 1985 [AU] Australia ............................. PG8770

[51] Int. Cl.⁴ .............................................. C01F 7/00
[52] U.S. Cl. .................................... 423/119; 423/121; 423/512 A
[58] Field of Search ................... 423/119, 121, 512 A

[56] References Cited

U.S. PATENT DOCUMENTS

| 1,360,248 | 11/1920 | Brobst | 423/167 |
|---|---|---|---|
| 1,377,822 | 5/1921 | Eustis | 423/119 |
| 2,242,258 | 5/1941 | Noll | 423/119 |
| 2,869,984 | 1/1959 | Spence | 423/119 |
| 3,198,622 | 8/1965 | Herzog et al. | 423/119 |
| 3,311,449 | 3/1967 | Atsukawa et al. | 423/82 |
| 3,775,532 | 11/1973 | Shah | 423/541 |
| 3,989,513 | 11/1976 | Dobos et al. | 423/119 |
| 4,113,832 | 9/1978 | Bell et al. | 423/119 |
| 4,483,830 | 11/1984 | Cresswell et al. | 423/121 |
| 4,518,571 | 5/1985 | Kaluzhsky et al. | 423/119 |

FOREIGN PATENT DOCUMENTS

| 75497 | 10/1973 | Japan | 423/121 |
|---|---|---|---|
| 35796 | 3/1977 | Japan | 423/119 |

Primary Examiner—John Doll
Assistant Examiner—Wayne A. Langel
Attorney, Agent, or Firm—Larson & Taylor

[57] ABSTRACT

A process for recovery of valuable products from Bayer process red mud comprises the steps: (a) digesting red mud with sulphur dioxide in the presence of water to dissolve soda, alumina and silica therein; (b) heating the product of step (a), with or without prior removal of insolubles, to selectively precipitate silica, and removing solids including the precipitated silica, to produce a liquor containing soda and alumina; (c) causticizing the liquor to precipitate calcium sulphite; and (d) separating the precipitated calcium sulphite from the liquor to produce calcium sulphite and sodium aluminate solution as products. In a preferred embodiment calcium sulphite produced in step (c) is calcined to regenerate lime and sulphur dioxide for recycle to the liquor causticization and red mud digestion stages respectively, and sodium aluminate produced in step (d) is returned to the Bayer process.

9 Claims, 1 Drawing Figure

RECOVERY OF SODIUM ALUMINATE FROM BAYER PROCESS RED MUD

This invention relates to the treatment of waste products of the Bayer process for extraction of alumina from bauxite.

It is an object of the present invention to provide a process for the economical recovery of soda and alumina normally contained within the red mud residue remaining after extraction of alumina from bauxite by the Bayer process. The invention also provides a process which may be fully integrated with the traditional Bayer process, in that the soda and alumina are recovered in the form of a caustic aluminate solution which may be returned directly to the process. Thus, valuable components ordinarily discarded in the residual red mud may be directly returned to the Bayer process resulting in a significant reduction in the make-up of caustic soda and improvement in overall process efficiency.

THE PRIOR ART

A number of methods have been proposed to reduce the cost of soda and alumina loss due to the desilication product in the red mud. Such procedures (mainly sinter and high temperature hydrothermal processes) are technically complex, require high energy input or reagent consumption and usually are only economically viable for those bauxites with moderately high levels of silica. An alternative method for recovery of the valuable components from red mud, using relatively simple processing, involves the treatment of the aqueous red mud slurry with sulphur dioxide.

A process whereby a red mud slurry is treated with sulphur dioxide to extract the soda, alumina and silica components has been reported (Japanese Pat. No. 25,118/1974). The solution containing the dissolved species is seeded and the slurry is then heated to precipitate simultaneously an inseparable mixture of basic aluminium sulphite and silica gel. While this process results in the removal of some components of the red mud, the product mixture obtained is not in a useful form. Specifically, the alumina component of the product cannot be economically recovered by conventional processing, including processing in a Bayer circuit, because of its extremely high silica content and thus this product mixture is of only limited utility. In addition, recovery of the soda in the mud is given only a passing mention and is not detailed in any way. As the caustic soda make up for the Bayer process can be one of the major contributors to the cost of alumina production it is most important that the soda component be recovered in a useful form, preferably for direct recycle to the Bayer mainstream. This process does not achieve that objective and thus cannot be integrated with the Bayer process. A further deficiency of the process is that substantial amounts of sulphur dioxide are lost from the system in both the solid basic aluminium sulphite removed by filtration, and during slurry heating to precipitate simultaneously the alumina and silica components, when sulphur dioxide is evolved due to its decreasing solubility as the temperature is increased. In conclusion, it is not possible readily to recover the red mud components extracted with the foregoing process in a useful form. More specifically, the valuable soda and alumina components of red mud cannot be recycled to the Bayer process and consequently it is not possible to integrate the process with the traditional Bayer process.

In an alternative process (U.S. Pat. No. 3,311,449) a red mud slurry is treated with sulphur dioxide to extract soda selectively as an aqueous solution of sodium bisulphite. Water is added to the insoluble material from soda extraction, and the slurry is treated with sulphur dioxide to dissolve soluble alumina and silica in the mud. After removal of the residue, the filtrate is heated, thereby raising the pH and precipitating silica. The solution separated from the deposited silica is further heated to precipitate basic aluminium bisulphite, which is then calcined to give alumina and sulphur dioxide. Although this process claims to produce "substantially pure alumina", the material produced on calcination of the basic aluminium bisulphite contains up to 2.5% silica, which is unacceptably high when compared to the specification for reduction grade alumina, which is typically 0.04% maximum. As this product is not of the required quality for most applications, the alumina would probably have to be recycled as a feedstock for the Bayer process, thus offsetting the energy advantages in producing alumina from the red mud. In the above process, soda is recovered in the form of an impure sodium bisulphite solution containing silica, and is obviously not suitable for return to the Bayer process to replenish the soda lost to the desilication product formed during digestion. Consequently, it would not be possible to integrate the abovementioned process with the Bayer process for recycle of the soda and alumina recovered from the red mud.

In previous publications relating to the sulphurous acid treatment of red mud, little attention has been paid to recovery of the extractable components in a form which would allow them to be recycled to the Bayer process. This is particularly true of the soda extracted from the mud. Surprisingly, the above mentioned processes both recover sodium sulphite or bisulphite solutions, but then present no detailed treatment of, or use for the solutions. In contrast, the present invention describes a process which, although based on the sulphurous acid treatment of red mud, recycles the extracted soda and alumina as a caustic aluminate solution. Consequently, the process can be fully integrated with the Bayer process to reduce caustic soda make-up substantially and return alumina which would ordinarily be lost.

SUMMARY OF THE INVENTION

In one aspect the invention involves contacting sulphur dioxide with a slurry of red mud to dissolve the soda, alumina and silica present in the desilication product. After separation of the insoluble portion, the filtrate is heated to selectively precipitate the silica which is then removed to give a solution containing the soluble soda and alumina initially extracted from the red mud. The silica precipitation is closely controlled to minimize co-precipitation of aluminium compounds with the silica, and thus achieve the maximum recycle of alumina. The aforementioned liquor containing both the soda and alumina values is causticized with lime. A caustic aluminate solution is produced that may be returned to the Bayer process. Solid calcium sulphite is calcined to recover the raw materials used in the process, namely lime and sulphur dioxide. The process may be applied to red muds derived from a wide variety of bauxite ores to reduce reagent losses while yielding a substantial reduction in the volume of waste residue from the ores. The process has, additionally, the ability to facilitate extraction of minerals, such as titania, which are not ordinarily considered recoverable from the bauxite.

The accompanying drawing, FIG. 1, is a flow sheet illustrating the integrated process, as will be described in more detail below.

DESCRIPTION OF PREFERRED EMBODIMENTS OF THE INVENTION

Figure 1:
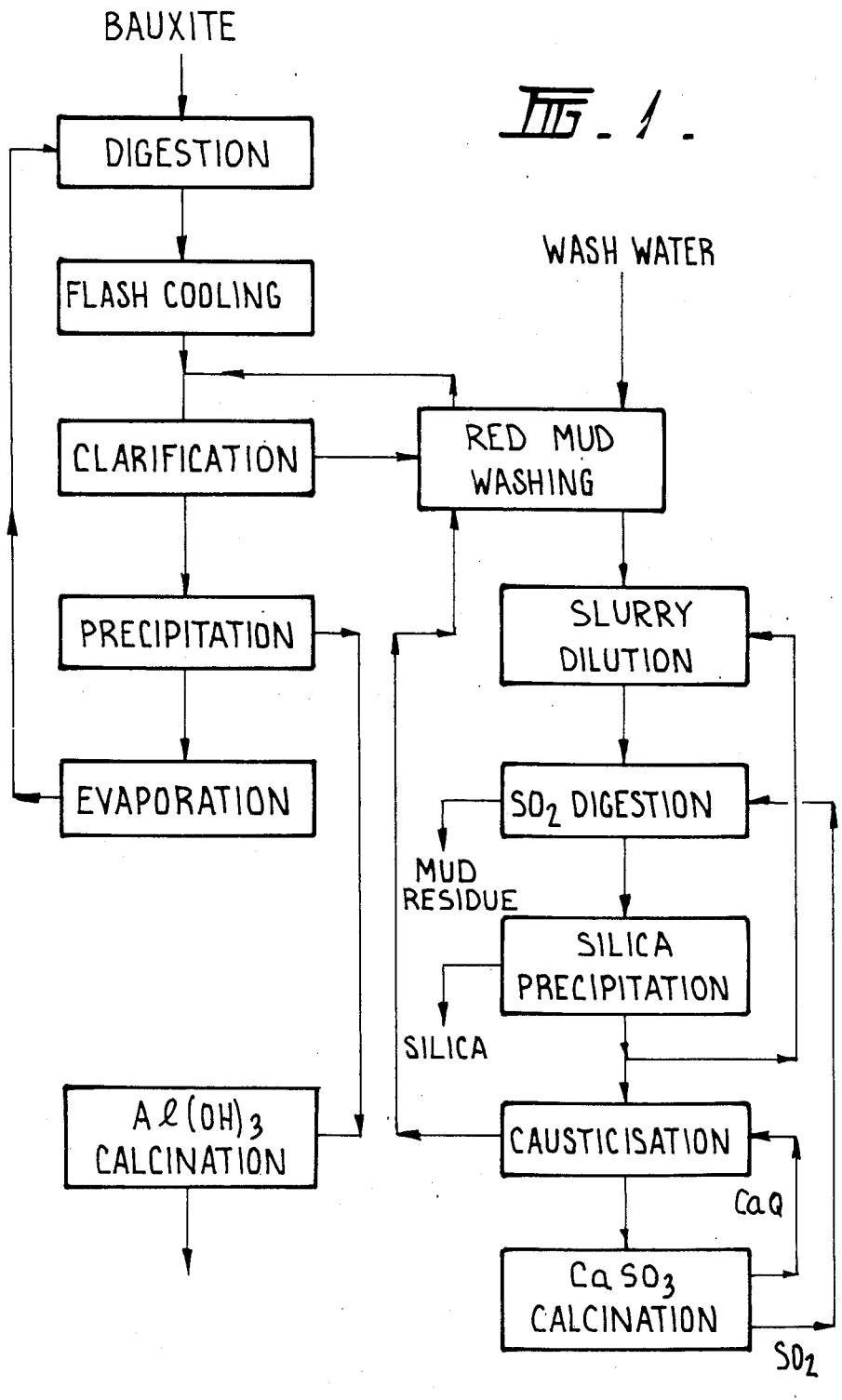

According to the invention, the red mud from the Bayer process in the form of a slurry or a cake is mixed with aqueous sulphurous acid, or alternatively gaseous sulphur dioxide is introduced into an aqueous slurry of red mud. After digestion a solution now enriched with the soda, alumina and silica from the red mud is separated from a residue containing principally the iron and titanium-bearing minerals together with some insoluble aluminium minerals. This residue may be washed and discarded or, alternatively, may be further treated to recover valuable components such as titanium compounds. It is noteworthy that the volume of the residue is considerably reduced from that originally leaving the Bayer process and, therefore, the cost and difficulties of disposal are reduced accordingly.

According to one preferred embodiment of the invention, there is provided a process for the recovery of soda and alumina from Bayer process red mud characterized by the following steps:

(a) digestion of the red mud slurry or filter cake in an aqueous solution of sulphur dioxide (sulphurous acid) and separation of the insoluble residue.

(b) treatment of the filtrate from (a) to selectively precipitate silica, preferably by heating to a temperature in the range 40°–80° C. with suitable agitation, followed by the separation of the precipitated material from the liquor.

(c) causticization, for example with calcium oxide or calcium hydroxide, of the liquor from (b) to precipitate insoluble calcium sulphite hemihydrate and form a sodium aluminate solution, preferably for a holding time in the range 0.25–4.0 hours.

(d) calcination of the calcium sulphite produced in (c), preferably in the temperature range 1000°–1500° C., to regenerate lime and sulphur dioxide for recycle.

(e) return of the sodium aluminate solution produced in (c) to the Bayer process.

(f) recycle of the lime and sulphur dioxide produced in (d) to the liquor causticization and red mud digestion stages respectively.

The residue from step (a) need not be separated from the liquor before precipitation of the silica.

When step (b) is conducted batch-wise, the holding time may be up to 3 hours.

Preferably the pH of the solution resulting from step (b) is in the range of 2.8–3.8.

In step (c), the alkaline calcium compound is preferably added such that the mole ratio of calcium to sulphur in the mixture is in the range 1.0–2.0.

The sodium aluminate liquor of step (e) may be returned to the Bayer process by addition to the mud washing system, the pregnant liquor stream, the spent liquor stream or any combination of the above. The sodium aluminate liquor may be concentrated by evaporation before returning to the Bayer circuit.

The liquor from step (c) may be further purified by treatment with barium oxide, barium hydroxide or barium aluminate to precipitate barium sulphite and produce a sodium aluminate liquor with a very low sulphite content for return to the Bayer process.

Preferably in step (d) the atmosphere in the calcination apparatus is maintained with a low activity of oxygen in order to facilitate the decomposition of calcium sulphite to calcium oxide and sulphur dioxide. Some of the solids stream from causticization may be removed to prevent impurity build-up and the recycled stream may be replenished with a fresh portion of causticizing agent.

In a further preferred embodiment of the process, the sulphurous acid leach liquor containing the soda, alumina and silica is passed to a vessel or vessels where it is subjected to suitable agitation and where the temperature is slowly raised to a temperature in the range 40°–80° C. Under such conditions the pH of the liquor is raised to a value in the range 2.8–3.8 and the silica present in solution is caused to precipitate, resulting in a liquor substantially free of silica. Using a batch-wise procedure, the holding time depends on the scale of operation, but for a laboratory experiment using one liter of liquor the holding time is up to 3 hours with a preferred time in the range 30–120 minutes. The required holding times in a continuous flow system may, however, be quite different. Careful control of the conditions is necessary to facilitate the precipitation of silica in a form suitable for separation, and also to ensure selective precipitation of the silica with minimal co-precipitation of aluminium compounds.

According to a variation of the process, the first two stages may be combined, provided that the residue from the first stage is not to be processed further. Thus, the slurry from sulphurous acid digestion, prior to separation of the undissolved residue, is subjected to silica precipitation as detailed above, and the silica is then removed with the aforementioned insoluble residue.

In the third stage of the process the liquor, now containing only the soda and alumina, is subjected to causticization by treatment with an alkaline calcium compound such as calcium oxide or calcium hydroxide. The causticizing agent is added such that the mole ratio Ca:S in the mixture is in the range 1.0–2.0, preferably 1.0–1.5. The reaction is carried out at a temperature in the range 20°–150° C., perferably 80°–110° C., with a holding time of 0.25–4.0 hours, preferably 0.5–2 hours. After such treatment, insoluble calcium sulphite hemihydrate is formed and the resultant liquor contains the soda and alumina values originally present in the red mud, substantially in the form of caustic soda and sodium aluminate. The calcium sulphite hemihydrate is removed by filtration and the caustic liquor may be returned to the Bayer process to replace those values which would have otherwise been lost. This addition can occur in a number of ways, for instance, to the mud washing system, to the pregnant liquor stream or to the spent liquor cycle. In a preferred embodiment the liquor is returned to the red mud washing circuit of the Bayer process but this should not be considered a limitation on the invention. Optionally, it may be desirable to concentrate the liquor by evaporation before returning to the Bayer circuit. If it is necessary that the level of sulphite be further reduced from that obtained after lime causticization, another option is to treat the liquor further by some suitable means of purification, for instance, with a barium compound such as barium oxide, barium hydroxide or barium aluminate, before returning the caustic liquor to the Bayer process.

In the final stage of the process, the calcium sulphite formed on causticization is calcined in a suitable apparatus to regenerate gaseous sulphur dioxide for the sulphurous acid digestion and calcium oxide for causticization. The temperature for the calcination should be in the range 1000°–1500° C., preferably 1050°–1300° C. Further, it is necessary that the atmosphere within the calcination apparatus be maintained with a low activity of oxygen in order that the calcium sulphite will decompose to calcium oxide and sulphur dioxide rather than undergo oxidation to calcium sulphate. If the conditions of calcination are such that impurities, for example, calcium sulphate or coal ash, are produced or introduced during calcination, it may be necessary to remove a portion of the recycle stream in order to prevent a build-up of undesirable species within the system. If some of the stream from causticization is removed to prevent impurity build-up, then the recycled stream is replenished with a fresh portion of suitable causticizing agent, for example, limestone, calcite or calcium hydroxide. The sulphur dioxide is recovered from the off-gases of the calcination device by a suitable gas recovery system and is returned to the red mud treatment stage. It should be noted that sulphur dioxide for recycle may also be collected from other stages in the process due to its decreasing solubility as the temperature is raised.

The sulphur dioxide used in the invention should preferably be concentrated and of a high purity; however, other sources of sulphur dioxide, such as flue gases from the steam generation plant or off-gases from alumina calcination may be utilized to replenish any sulphur dioxide losses. As sulphur dioxide is environmentally harmful and must be removed to a significant extent before discharge of the off-gases into the atmosphere, the use of these gases in the process serves the dual purpose of protecting the environment and contributing to the recovery of valuable components contained in the red mud.

The process as described provides a unique combination of conditions which results in efficient recovery of valuable components which are normally lost to the red mud and under the appropriate circumstances has the potential to render most of the bauxite components useful. The process may be fully integrated with the Bayer process as illustrated in the preferred embodiment given in FIG. 1. The configuration shown in FIG. 1, however, should not be considered a limitation on the invention as the liquor from causticization may also be returned to the Bayer mainstream in other ways, such as in the pregnant liquor stream or the spent liquor cycle. A further major advantage of the invention is that the reagents used in the process are recycled and so raw material consumption is low in the recovery of the soda and alumina from the red mud.

The process is further described by reference to the following examples.

EXAMPLE 1

Red mud (100 g) was added to a saturated sulphurous acid solution (1000 ml) with constant stirring at ambient temperature. The composition of the red mud was:

$Na_2O$ 9.0%; $Al_2O_3$ 22.2%; $SiO_2$ 15.7%; $CaO$ 1.9%; $Fe_2O_3$ 35.7%; $TiO_2$ 7.7%; LOI 4.8%

A constant passage of sulphur dioxide through the digestion slurry maintained the saturation of the sulphurous acid solution. After 10 minutes the insoluble residue (57.3 g) was separated from the liquor (985 ml) and washed with sulphurous acid (50 ml) and then water (300 ml). The composition of the residue was:

$Na_2O$ 0.3; $Al_2O_3$ 15.4; $SiO_2$ 6.6; $CaO$ 0.4; $Fe_2O_3$ 57.4; $TiO_2$ 12.4; LOI 6.4

Thus, the following extractions were achieved (calculated assuming no extraction of $Fe_2O_3$).

$Na_2O$ 97.8%; $Al_2O_3$ 54.6%; $SiO_2$ 72.5%; $CaO$ 87.9%

The composition of the leach liquor was:

$Na_2O$ 9.0 g/l; $Al_2O_3$ 8.6 g/l; $SiO_2$ 11.3 g/l; $CaO$ 1.7 g/l; $SO_2$ 55.1 g/l

EXAMPLE 2

The sulphite leach liquor (910 ml) produced in Example 1 was stirred and heated in a water bath at 60° C. for 60 minutes. The pH of the solution after the precipitation of the silica was about 3.4. The precipitated material (20.3 g) was separated from the liquor (600 ml) and washed with sulphurous acid (200 ml) and then water (400 ml). The composition of the filter cake was:

$SiO_2$ 50.8%; $Al_2O_3$ 23.9%; LOI 21.5%

While the liquor had the following analysis $Na_2O$ 9.0 g/l; $Al_2O_3$ 5.9 g/l; $SiO_2$<0.1 g/l $CaO$ 1.8 g/l; $SO_2$ 30.8 g/l

EXAMPLE 3

The liquor (500 ml) produced in Example 2 was treated with calcium oxide (14.8 g) to give a Ca:S molar ratio of 1.1. The mixture was stirred at the boiling point for two hours after which the solid calcium sulphite hemihydrate (34.1 g) was removed and washed with water (50 ml). The composition of the filtrate (440 ml) was:

$Na_2O$ 9.1 g/l; $Al_2O_3$ 3.3 g/l; $SiO_2$<0.1 g/l; $CaO$<0.1 g/l; $SO_2$ 3.4 g/l which corresponds to a sulphite removal efficiency of 89%. The analysis for the calcium sulphite hemihydrate was:

$CaO$ 41.6% (expected for $CaSO_3.\frac{1}{2}H_2O$ 43.5%)

and its identification was confirmed by its X-ray diffraction pattern.

EXAMPLE 4

The liquor (340 ml) produced in Example 3 was treated with barium hydroxide octahydrate (6.4 g) to give a Ba:S molar ratio of 1.1. The mixture was stirred at its boiling point for two hours after which the insoluble barium sulphite (4.3 g) was separated from the liquor (320 ml) and washed with water (50 ml). The composition of the liquor was:

$Na_2O$ 9.1 g/l; $Al_2O_3$ 3.3 g/l; $SiO_2$<0.1 g/l; $CaO$<0.1 g/l; $SO_2$ 0.9 g/l which corresponds to 97% removal of the sulphur dioxide contained in the original liquor entering causticization. The identification of the barium sulphite was confirmed by X-ray diffraction.

EXAMPLE 5

Calcium sulphite hemihydrate (0.99 g) obtained from the treatment of sulphite liquor with lime as in Example 3 was calcined for 30 minutes at 1100° C. under a nitrogen atmosphere. The product (0.51 g) obtained was identified by X-ray diffraction as being predominantly calcium oxide with a little calcium hydroxide.

We claim:

1. A process for recovery of valuable products from Bayer process red mud, which comprises the following steps:
   (a) digesting red mud with sulphur dioxide in the presence of water to dissolve soda, alumina and silica therein;
   (b) heating the product of step (a), with or without prior removal of insolubles, to selectively precipitate silica, and removing solids including the precipitated silica, to produce a liquor containing soda and alumina;
   (c) causticizing the liquor to precipitate calcium sulphite;
   (d) separating the precipitated calcium sulphite from the liquor to produce calcium sulphite and sodium aluminate solution as products.

2. A process for the recovery of soda and alumina from Bayer process red mud which comprises the following steps:
   (a) digesting the red mud slurry or filter cake in an aqueous solution of sulphur dioxide;
   (b) treating the product of step (a), with or without prior removal of insolubles, by heating to a temperature in the range 40°–80° C. with suitable agitation, and separating the precipitated material from the liquor;
   (c) causticizing the liquor from step (b) with calcium oxide or calcium hydroxide to precipitate insoluble calcium sulphite hemihydrate and form a sodium aluminate solution;
   (d) calcining the calcium sulphite produced in (c), to regenerate lime and sulphur dioxide for recycle;
   (e) returning the soldium aluminate solution produced in (c) to the Bayer process;
   (f) recycling the lime and sulphur dioxide produced in step (d) to the liquor causticization and red mud digestion stages respectively.

3. A process according to claim 1 or claim 2 in which the pH of the solution resulting from step (b) is in the range of 2.8 to 3.8.

4. A process according to claim 1 or claim 2 in which, in step (c), the alkaline calcium compound is added such that the mole ratio of calcium to sulphur in the mixture is in the range 1.0–2.0.

5. A process according to claim 1 or claim 2 in which the sodium aluminate liquor of step (e) is returned to the Bayer process by addition to the mud washing system, the pregnant liquor stream, the spent liquor stream or any combination thereof.

6. A process according to claim 5 in which the sodium aluminate liquor is concentrated by evaporation before returning to the Bayer circuit.

7. A process according to claim 5 in which the liquor from step (c) is further purified by treatment with barium oxide, barium hydroxide or barium aluminate to precipitate barium sulphite and produce a sodium aluminate liquor with a very low sulphite content for return to the Bayer process.

8. A process according to claim 2 in which in step (d) the atmosphere in the calcination apparatus is maintained with a low activity of oxygen in order to facilitate the decomposition of calcium sulphite to calcium oxide and sulphur dioxide.

9. A process according to claim 1 or claim 2 in which the product of step (a) is passed to a vessel or vessels where it is subjected to suitable agitation and where the temperature is slowly raised to a temperature in the range 40°–80° C. and the pH is raised to a value in the range 2.8–3.8 and the silica present in solution is caused to precipitate, resulting in a liquor substantially free of silica.

* * * * *